(12) United States Patent
Wang et al.

(10) Patent No.: US 10,829,134 B2
(45) Date of Patent: Nov. 10, 2020

(54) PERMANENT MAGNET RETARDER

(71) Applicant: Xiangdong Wang, Nanjing (CN)

(72) Inventors: Xiangdong Wang, Nanjing (CN);
Liping Zhou, Nanjing (CN)

(*) Notice: Subject to any disclaimer, the term of this patent is extended or adjusted under 35 U.S.C. 154(b) by 220 days.

(21) Appl. No.: 15/993,563

(22) Filed: May 30, 2018

(65) Prior Publication Data

US 2018/0273059 A1 Sep. 27, 2018

Related U.S. Application Data

(63) Continuation of application No. PCT/CN2016/105297, filed on Nov. 10, 2016.

(30) Foreign Application Priority Data

Dec. 1, 2015 (CN) .......................... 2015 1 0864262

(51) Int. Cl.
*B61K 7/02* (2006.01)
*B60L 7/26* (2006.01)
(Continued)

(52) U.S. Cl.
CPC ...... *B61K 7/02* (2013.01); *B60L 7/26* (2013.01); *B60W 10/196* (2013.01); *B61L 17/026* (2013.01)

(58) Field of Classification Search
CPC .......... B60L 7/26; B60W 10/196; B61K 7/02; B61L 17/026; F16F 6/005; F16F 2222/06; F16F 15/03; F16F 15/18; F16F 15/005
See application file for complete search history.

(56) References Cited

U.S. PATENT DOCUMENTS 1,553,723 A * 9/1925 Shepard .................. B61K 7/12
246/182 A
3,232,385 A 2/1966 Huber
(Continued)

FOREIGN PATENT DOCUMENTS

CN 1076899 A 10/1993
CN 2540344 Y 3/2003
(Continued)

OTHER PUBLICATIONS

English translation of CN105235711A (Year: 2016).*
(Continued)

*Primary Examiner* — Bradley T King
*Assistant Examiner* — Mahbubur Rashid
(74) *Attorney, Agent, or Firm* — Erson IP (Nelson IP)

(57) ABSTRACT

A permanent magnet retarder comprises a housing and a cylinder. The cylinder (2) is inserted into the housing (1) and can move up and down relative to the housing (1). The housing (1) is further provided with a conductor (3) and a permanent magnet (4) therein which are disposed oppositely and constitute a permanent magnet eddy current deceleration assembly. The conductor (3) is fixedly disposed on an inner wall of the housing (1) and the permanent magnet (4) is fixedly disposed on the cylinder (2); alternatively, the conductor (3) is fixedly disposed on the cylinder (2) and the permanent magnet (4) is fixedly disposed on the inner wall of the housing (1). The housing (1) is further provided with an upper return permanent magnet (5) and a lower return permanent magnet (6) therein disposed oppositely.

9 Claims, 11 Drawing Sheets (51) Int. Cl.
*B60W 10/196* (2012.01)
*B61L 17/02* (2006.01)

(56) References Cited

U.S. PATENT DOCUMENTS

| | | | | |
|---|---|---|---|---|
| 4,380,959 | A * | 4/1983 | Brems | B23Q 7/1421 104/89 |
| 5,473,209 | A * | 12/1995 | Lamb | H02K 49/046 310/75 D |
| 8,863,563 | B2 * | 10/2014 | Gentile | E05B 47/0038 70/276 |
| 2002/0033746 | A1 * | 3/2002 | Kuwahara | H01F 7/06 335/229 |
| 2002/0093408 | A1 * | 7/2002 | Morita | H01F 7/1623 335/220 |
| 2005/0072638 | A1 * | 4/2005 | Kim | F16F 15/03 188/267.2 |
| 2010/0033030 | A1 * | 2/2010 | Amemiya | H02K 33/00 310/12.16 |
| 2013/0015026 | A1 * | 1/2013 | Li | H02K 49/043 188/267 |
| 2016/0099123 | A1 * | 4/2016 | Ohda | H01F 7/08 335/170 |
| 2017/0045107 | A1 * | 2/2017 | Chen | F16F 6/005 |
| 2017/0085167 | A1 * | 3/2017 | Perez D Az | H02K 49/043 |
| 2017/0294828 | A1 * | 10/2017 | Chen | H02K 49/043 |

FOREIGN PATENT DOCUMENTS

| | | | |
|---|---|---|---|
| CN | 1676388 | A | 10/2005 |
| CN | 2875901 | Y * | 3/2007 |
| CN | 200948803 | Y | 9/2007 |
| CN | 202863468 | U | 4/2013 |
| CN | 105235711 | A * | 1/2016 |
| CN | 105365846 | A | 3/2016 |

OTHER PUBLICATIONS

CN-2875901-Y (Year: 2007).*
English translation of CN202863468U (Year: 2013).*
English translation drawings of CN105235711A (Year: 2016 (Year: 2016).*
International Search Report of PCT/CN2016/105297 dated Jan. 25, 2017.

* cited by examiner

PERMANENT MAGNET RETARDER

CROSS-REFERENCE TO RELATED APPLICATIONS

This application is a continuation of International Patent Application No. PCT/CN2016/105297 with a filing date of Nov. 10, 2016, designating the United States, now pending, and further claims priority to Chinese Patent Application No. 201510864262.7 with a filing date of Dec. 1, 2015. The content of the aforementioned applications, including any intervening amendments thereto, are incorporated herein by reference.

TECHNICAL FIELD

The present invention relates to a retarder, and particularly relates to a permanent magnet retarder with simple structure, high reliability and low maintenance and repair cost.

BACKGROUND OF THE PRESENT INVENTION

The retarder is a speed regulating tool capable of automatically controlling slipping speed of a vehicle without using an external energy source. The retarder is installed on a steel rail, and can be installed and used on a linear segment, a curve segment and a turnout zone in a marshalling yard.

The existing retarder is composed of two major parts: a sliding oil cylinder assembly and a housing assembly. A speed valve that plays a judgment action on vehicle speed, and a pressure valve that plays a brake action on the vehicle are arranged in a sliding oil cylinder; and the sliding oil cylinder is filled with a certain volume of oil and nitrogen. The retarder plays no deceleration action on vehicles slower than critical speed (selected as required), and only plays a deceleration action on vehicles faster than the critical speed. The above retarder has the defects of complicated structure, low reliability and high sealing requirement, and needs to regularly replace the oil and supplement the nitrogen.

SUMMARY OF PRESENT INVENTION

A purpose of the present invention is to provide a permanent magnet retarder with simple structure, high reliability and low maintenance and repair cost with respect to the problems in the prior art.

The purpose of the present invention is achieved through the following technical solution:

A permanent magnet retarder comprises a housing and a cylinder, wherein the cylinder is inserted into the housing and can move up and down relative to the housing. The housing is further provided with a conductor and a permanent magnet therein which are disposed oppositely and constitute a permanent magnet eddy current deceleration assembly. The conductor is fixedly disposed on an inner wall of the housing and the permanent magnet is fixedly disposed on the cylinder; alternatively, the conductor is fixedly disposed on the cylinder and the permanent magnet is fixedly disposed on the inner wall of the housing. When relative motion occurs between the cylinder and the housing, relative motion occurs between the conductor and the permanent magnet. At this moment, the conductor cuts a magnetic line of force of the permanent magnet and generates eddy current on the conductor, and an induced magnetic field generated by the eddy current may hinder the relative motion between the housing and the cylinder. The housing is further provided with an upper return permanent magnet and a lower return permanent magnet therein disposed oppositely. Attraction or repulsion generated between the upper return permanent magnet and the lower return permanent magnet can make the cylinder return to zero position automatically.

A spring that enables the cylinder to return to the zero position is also arranged on the cylinder. The spring, the upper return permanent magnet and the lower return permanent magnet form a permanent magnet spring return assembly that enables the cylinder to return to the zero position automatically.

The spring is sleeved on a lower part of the cylinder or installed on a bottom end of the cylinder. When the spring is sleeved on the lower part of the cylinder, a supporting seat is fixedly disposed on the inner wall of the housing; and when the lower end of the cylinder penetrates through the supporting seat and moves down, the spring is compressed. When the spring is installed on the bottom end of the cylinder, the lower end of the spring is fixed to the bottom of the housing; and when the cylinder moves down, the spring is compressed.

The supporting seat is fixedly disposed on the inner wall of the housing. The supporting seat is positioned on the lower part of the housing and the cylinder can penetrate through the supporting seat and can move down. At this moment, the lower return permanent magnet is fixedly disposed on the supporting seat, while the upper return permanent magnet is disposed on the cylinder relative to the lower return permanent magnet and can move up and down along with the cylinder. When the cylinder moves down, the upper return permanent magnet is close to the lower return permanent magnet so that the repulsion generated between the upper return permanent magnet and the lower return permanent magnet is increased, thereby increasing downward resistance of the cylinder; and the repulsion generated between the upper return permanent magnet and the lower return permanent magnet can enable the cylinder to return to zero position after the vehicle passes.

The lower return permanent magnet is fixedly disposed on the inner wall of the housing. At this moment, the upper return permanent magnet is disposed on the cylinder relative to the lower return permanent magnet and can move up and down along with the cylinder. When the cylinder moves down, the upper return permanent magnet is close to the lower return permanent magnet so that the repulsion generated between the upper return permanent magnet and the lower return permanent magnet is increased, thereby increasing downward resistance of the cylinder; and the repulsion generated between the upper return permanent magnet and the lower return permanent magnet can enable the cylinder to return to zero position after the vehicle passes.

The lower return permanent magnet is fixedly disposed on the bottom of the housing. At this moment, the upper return permanent magnet is disposed on a bottom end of the cylinder relative to the lower return permanent magnet and can move up and down along with the cylinder. When the cylinder moves down, the upper return permanent magnet is close to the lower return permanent magnet so that the repulsion generated between the upper return permanent magnet and the lower return permanent magnet is increased, thereby increasing downward resistance of the cylinder; and the repulsion generated between the upper return permanent magnet and the lower return permanent magnet can enable the cylinder to return to zero position after the vehicle passes.

When the upper return permanent magnet is fixedly disposed on an end cover of the housing, the lower return permanent magnet is disposed on the cylinder relative to the upper return permanent magnet and can move up and down along with the cylinder. When the cylinder moves down, the lower return permanent magnet is away from the upper return permanent magnet so that the cylinder needs to overcome the attraction generated between the upper return permanent magnet and the lower return permanent magnet when the cylinder moves down; and the attraction generated between the upper return permanent magnet and the lower return permanent magnet can enable the cylinder to return to zero position after the vehicle passes.

The permanent magnet is formed by one permanent magnet, or is an array formed by a plurality of permanent magnets or is formed by splicing a plurality of permanent magnets. When the permanent magnet is an array structure formed by a plurality of permanent magnets, polarities of adjacent permanent magnets are different.

A part of the cylinder exposed from the housing is provided with an elastic protective sheath to prevent dust from entering the housing.

The housing, the cylinder, the conductor and the permanent magnets adopt corresponding loop structures or polygon structures.

Compared with the prior art, the present invention has the following advantages:

In the permanent magnet retarder of the present invention, through the joint action of the permanent magnet eddy current deceleration assembly and a permanent magnet spring return assembly, the cylinder needs to overcome the resistance to consume energy of the vehicle when the cylinder moves down; and after the vehicle passes, the cylinder can automatically return to the zero position. Relative to the existing hydraulic retarder, the present invention does not need to add the oil or is not replaced regularly; and the nitrogen is not required to be added. Therefore, the permanent magnet retarder of the present invention has low sealing requirement, has the advantages of simple structure, high reliability and low maintenance and repair cost, and is suitable for popularization and use.

In the figures: 1-housing; 2-cylinder; 3-conductor; 4-permanent magnet; 5-upper return permanent magnet; 6-lower return permanent magnet; 7-spring; 8-supporting seat; 9-end cover; and 10-elastic protective sheath.

DETAILED DESCRIPTION OF PREFERRED EMBODIMENTS

The present invention is further described below in combination with drawings and embodiments.

Figure 9:
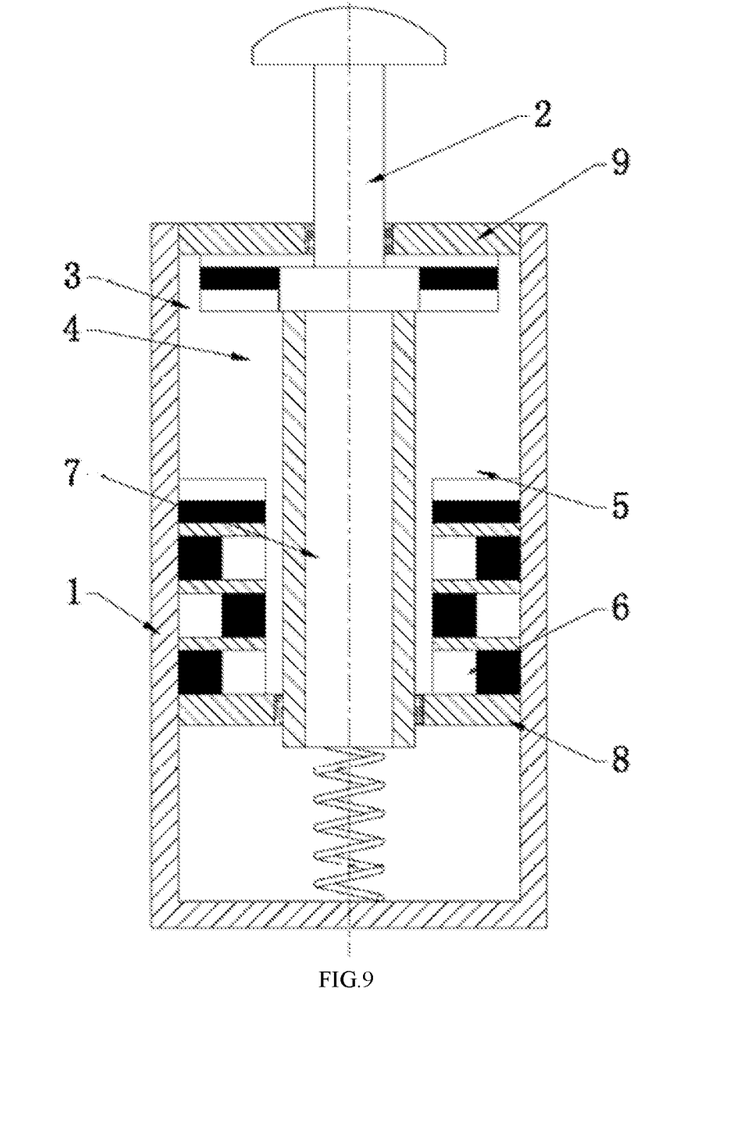
FIG. 9 is a structural schematic diagram of an embodiment 7 of a permanent magnet retarder in the present invention.
Figure 10:
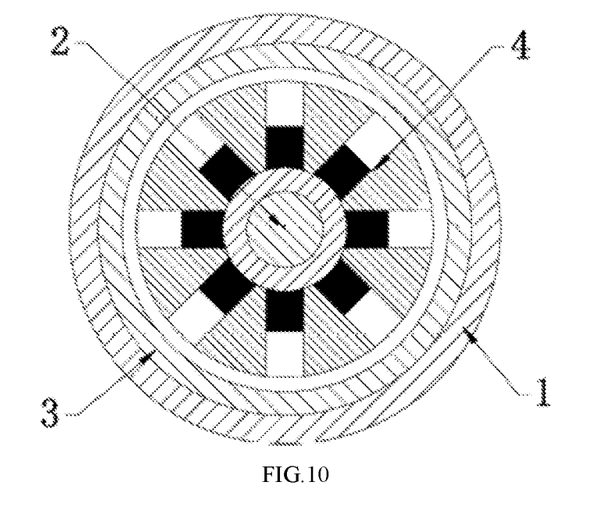
FIG. 10 is a sectional structural schematic diagram of an embodiment 8 of a permanent magnet retarder in the present invention.
Figure 11:
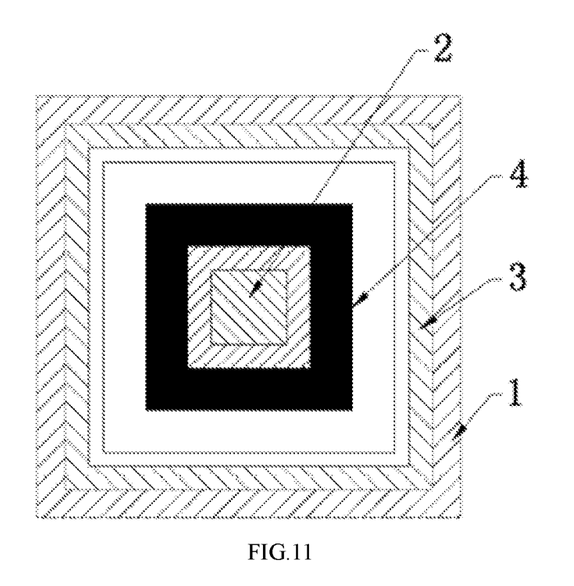
FIG. 11 is a sectional structural schematic diagram of an embodiment 9 of a permanent magnet retarder in the present invention.

As shown in FIGS. 1-11, a permanent magnet retarder comprises a housing 1 and a cylinder 2, wherein the cylinder 2 is inserted into the housing 1 and can move up and down relative to the housing 1. Specifically, a top end of the housing 1 is provided with an end cover 9. The cylinder 2 penetrates through the end cover 9 and is inserted into the housing 1. The housing 1 is further provided with a conductor 3 and a permanent magnet 4 therein which are disposed oppositely and constitute a permanent magnet eddy current deceleration assembly. The conductor 3 is fixedly disposed on an inner wall of the housing 1 and the permanent magnet 4 is fixedly disposed on the cylinder 2; alternatively, the conductor 3 is fixedly disposed on the cylinder 2 and the permanent magnet 4 is fixedly disposed on the inner wall of the housing 1. When relative motion occurs between the cylinder 2 and the housing 1, relative motion occurs between the conductor 3 and the permanent magnet 4. At this moment, the conductor 3 cuts a magnetic line of force of the permanent magnet 4 and generates eddy current on the conductor 3, and an induced magnetic field generated by the eddy current may hinder the relative motion between the housing 1 and the cylinder 2. The housing 1 is further provided with one or more pairs of an upper return permanent magnet 5 and a lower return permanent magnet 6 therein that attract or repel one another and disposed oppositely. Attraction or repulsion generated between the upper return permanent magnet 5 and the lower return permanent magnet 6 can make the cylinder 2 return to zero position automatically after the vehicle passes. In addition, a spring 7 that enables the cylinder 2 to return to the zero position is also arranged on the cylinder 2. The spring 7, the upper return permanent magnet 5 and the lower return permanent magnet 6 form a permanent magnet spring return assembly that enables the cylinder 2 to return to the zero position. In the above structure, the spring 7 is sleeved on a lower part of the cylinder 2 or installed on a bottom end of the cylinder 2 as required. When the spring 7 is sleeved on the lower part of the cylinder 2, a supporting seat 8 is fixedly disposed on the inner wall of the housing 1; and when the lower end of the cylinder 2 penetrates through the supporting seat 8 and moves down, the spring 7 is compressed. When the spring 7 is installed on the bottom end of the cylinder 2, the lower end of the spring 7 is fixed to the bottom of the housing 1; and when the cylinder 2 moves down, the spring 7 is compressed. The used permanent magnet 4 is formed by one permanent magnet, or is an array formed by a plurality of permanent magnets or is formed by splicing a plurality of permanent magnets. When the permanent magnet 4 is an array structure formed by a plurality of permanent magnets, polarities of adjacent permanent magnets 4 are different and a baffle plate is arranged between the adjacent permanent magnets 4. In the structures shown in FIGS. 1-10, the housing 1, the cylinder 2, the conductor 3 and the permanent magnets 4 adopt corresponding loop structures. In fact, the housing 1, the cylinder 2, the conductor 3 and the permanent magnets 4 can also adopt corresponding polygon structures (as shown in FIG. 11) or other structures. Generally, the conductor 3 is often made of copper, aluminum or other composite materials. Especially, when a copper ring, a copper plate or other copper products is used as the conductor 3, an eddy current induced magnetic field generated by cutting the magnetic line of force is strong.

The principle of the permanent magnet retarder is as follows: When the cylinder 2 moves up and down, relative motion occurs between the conductor 3 and the permanent magnet 4 in the permanent magnet eddy current deceleration assembly. When the relative motion occurs between the permanent magnet 4 and the conductor 3 in the permanent magnet eddy current deceleration assembly, the conductor 3 cuts a magnetic line of force of the permanent magnet 4 and generates eddy current on the conductor 3, and an induced magnetic field generated by the eddy current may hinder the relative motion between the permanent magnet 4 and the conductor 3. The higher the speed of the relative motion is, the larger the resistance generated between the permanent magnet 4 and the conductor 3 is. Specifically: (1) when a vehicle with low speed passes through the permanent magnet retarder, the cylinder 2 is pressed by wheels and moves down slowly; the generated resistance is small; and the permanent magnet retarder basically has no deceleration action on the vehicle; and (2) when a vehicle with high speed passes through the permanent magnet retarder, the generated resistance is large; and the cylinder 2 overcomes the resistance to move down to consume the energy of the vehicle, thereby playing the deceleration action. After the vehicle passes through the permanent magnet retarder, the permanent magnet spring return assembly makes the cylinder 2 return to the zero position by means of the repulsion or attraction between the upper return permanent magnet 5 and the lower return permanent magnet 6 as well as the elastic force of the spring 7.

Embodiment 1

Figure 1:
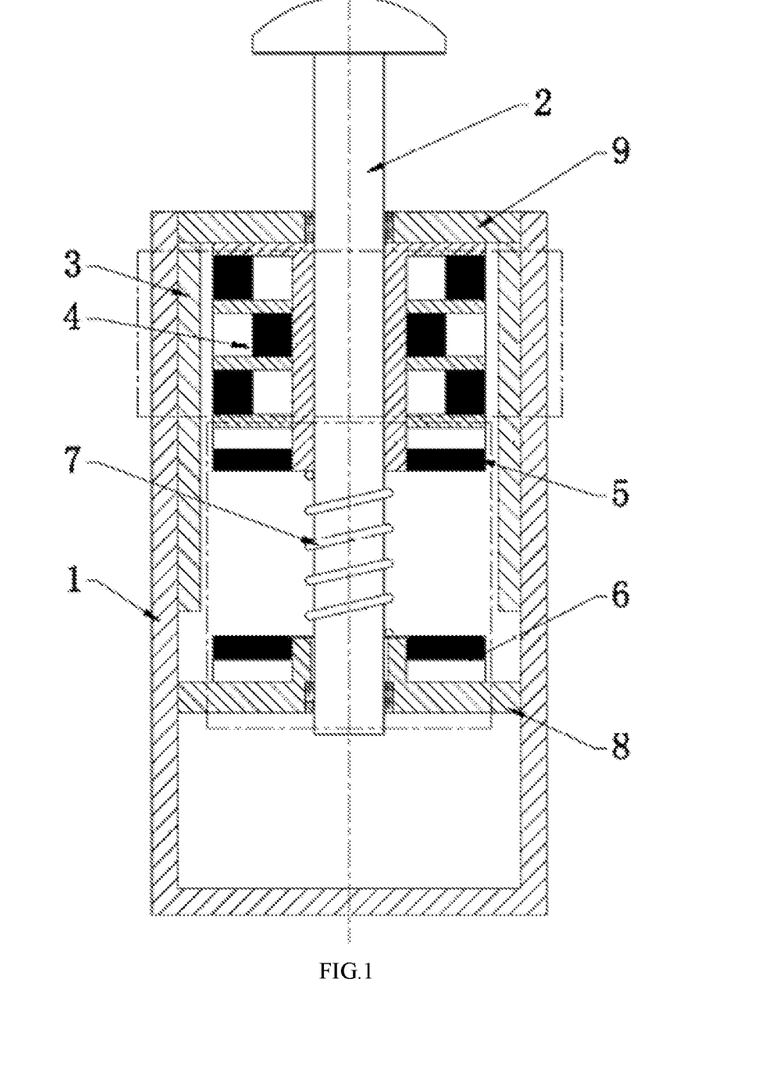
FIG. 1 is a structural schematic diagram of an embodiment 1 of a permanent magnet retarder in the present invention.
Figure 2:
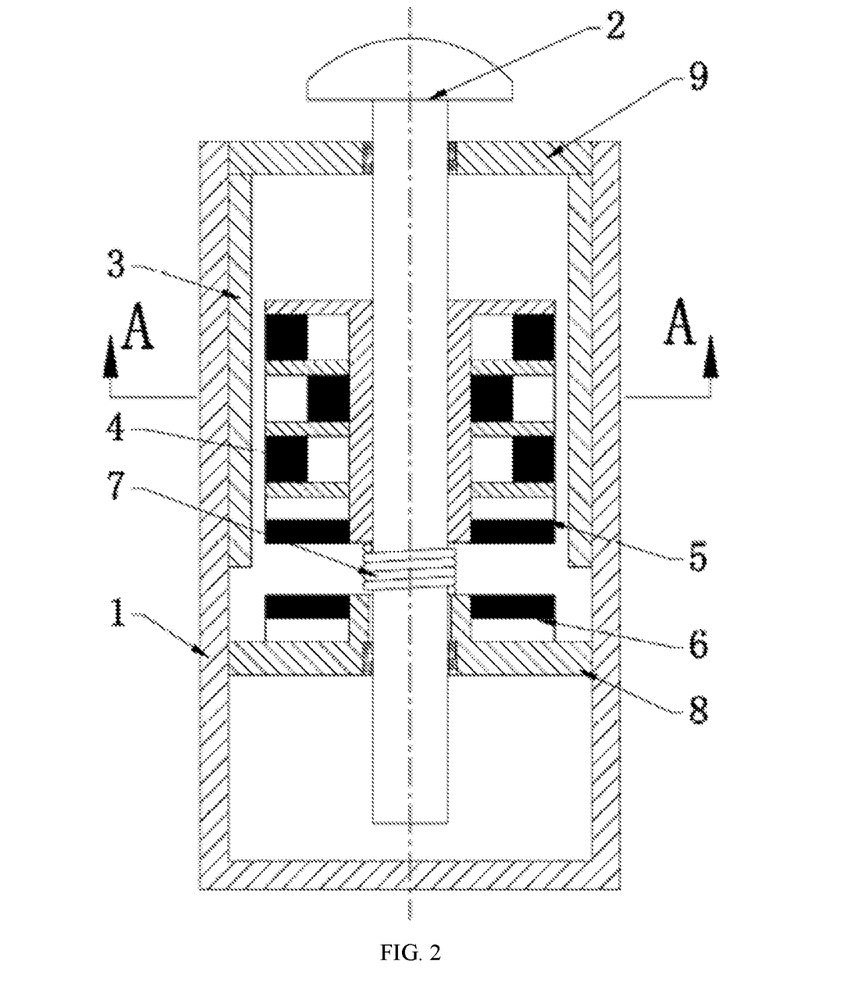
FIG. 2 is a structural schematic diagram when a cylinder is pressed by a passing vehicle in an embodiment 1 of a permanent magnet retarder in the present invention.
Figure 3:
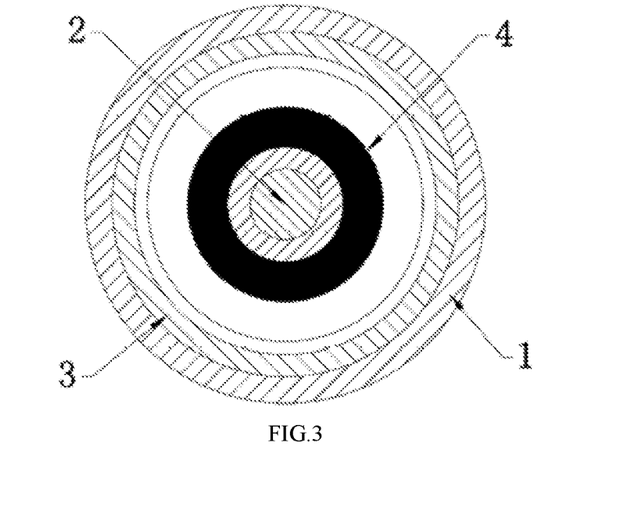
FIG. 3 is a structural schematic diagram of A-A section of FIG. 2.

As shown in FIGS. 1-3, a permanent magnet retarder comprises a housing 1 and a cylinder 2. The housing 1 comprises an end cover 9 and a supporting seat 8 disposed on the lower part of the housing 1. The lower end of the housing 1 successively penetrates through the end cover 9 and the supporting seat 8, and can move up and down in a vertical hole formed by the end cover 9 and the supporting seat 8. A component that can play the role of guidance, positioning, reducing friction or strengthening sealing is selectively disposed at the hole of the end cover 9 and the supporting seat 8. In an inner cavity of the housing 1 above the supporting seat 8, a conductor 3 is fixedly disposed on an inner wall of the housing 1, and a permanent magnet 4 disposed oppositely to the conductor 3 is fixedly disposed on the cylinder 2. The permanent magnet 4 is fixedly disposed on an installing seat disposed on the cylinder 2, and the permanent magnet 4 is arranged above the supporting seat 8. The conductor 3 adopts a copper loop structure. The permanent magnet 4 is formed by one permanent magnet, or is an array formed by a plurality of permanent magnets. When the permanent magnet 4 is an array structure formed by a plurality of permanent magnets, polarities of adjacent permanent magnets 4 are different. When relative motion occurs between the cylinder 2 and the housing 1, relative motion occurs between the conductor 3 and the permanent magnet 4. At this moment, the conductor 3 cuts a magnetic line of force of the permanent magnet 4 and generates eddy current on the conductor 3, and an induced magnetic field generated by the eddy current may hinder the relative motion between the housing 1 and the cylinder 2. The lower return permanent magnet 6 in the permanent magnet spring return assembly is fixedly disposed on the supporting seat 8, while the upper return permanent magnet 5 is disposed below the permanent magnet 4 on the cylinder 2 relative to the lower return permanent magnet 6 and can move up and down along with the cylinder 2. When the cylinder 2 moves down, the upper return permanent magnet 5 is close to the lower return permanent magnet 6 so that the repulsion generated between the upper return permanent magnet 5 and the lower return permanent magnet 6 is increased, thereby increasing downward resistance of the cylinder 2; and the repulsion generated between the upper return permanent magnet 5 and the lower return permanent magnet 6 can enable the cylinder 2 to return to zero position after the vehicle passes. Meanwhile, the spring 7 in the permanent magnet spring return assembly is sleeved on the lower part of the cylinder 2 and is positioned above the supporting seat 8. When the lower end of the cylinder 2 penetrates through the supporting seat 8 and moves down, the spring 7 can be compressed on the supporting seat 8 and generates upward elastic force (as shown in FIG. 2).

Embodiment 2

Figure 4:
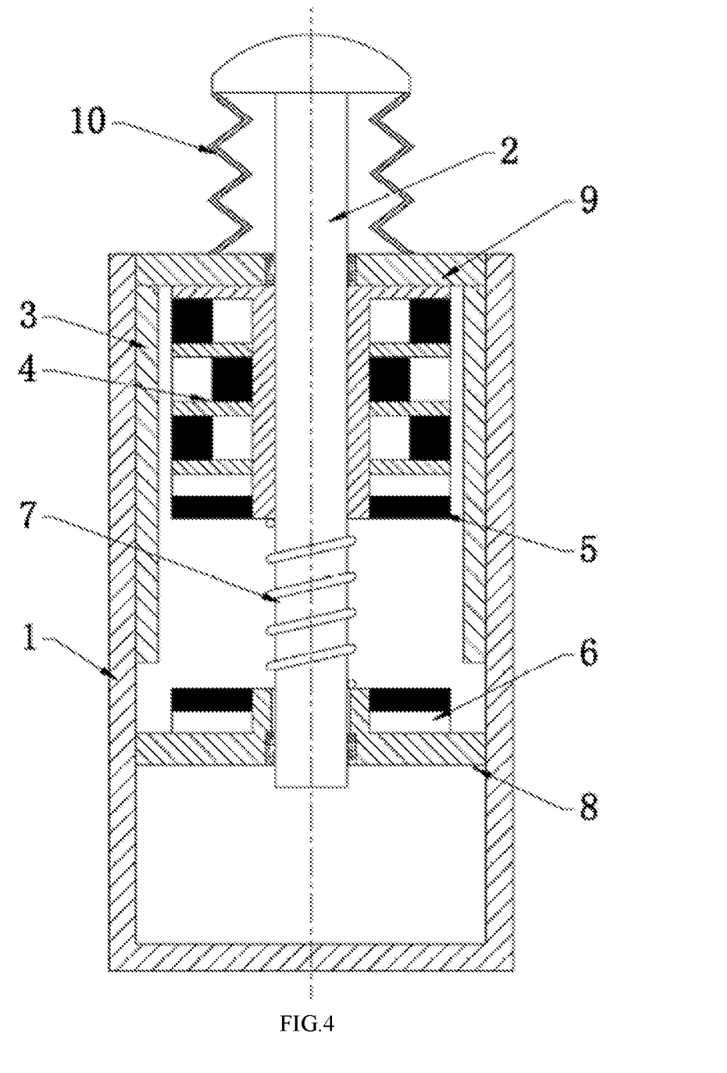
FIG. 4 is a structural schematic diagram of an embodiment 2 of a permanent magnet retarder in the present invention.

As shown in FIG. 4, based on embodiment 1, the difference between embodiment 2 and embodiment 1 is that: a part of the cylinder 2 exposed from the housing 1 is provided with an elastic protective sheath 10 to prevent dust from entering the housing 1.

Embodiment 3

Figure 5:
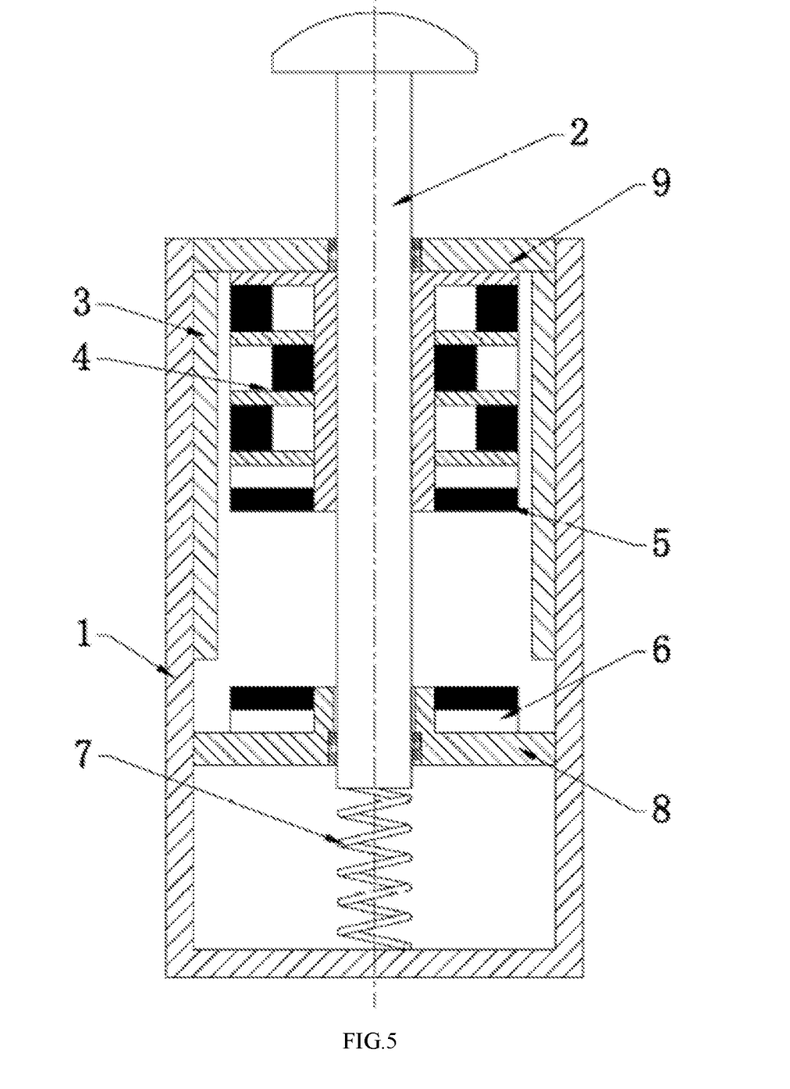
FIG. 5 is a structural schematic diagram of an embodiment 3 of a permanent magnet retarder in the present invention.

As shown in FIG. 5, based on embodiment 1, the difference between embodiment 3 and embodiment 1 is that: the spring 7 is installed on a bottom end of the cylinder 2 and is not sleeved on the lower part of the cylinder 2. At this moment, the lower end of the spring 7 is fixed to the bottom of the housing 1. When the lower end of the cylinder 2 penetrates through the supporting seat 8 and moves down, the spring 7 is compressed into the bottom of the housing 1.

Embodiment 4

Figure 6:
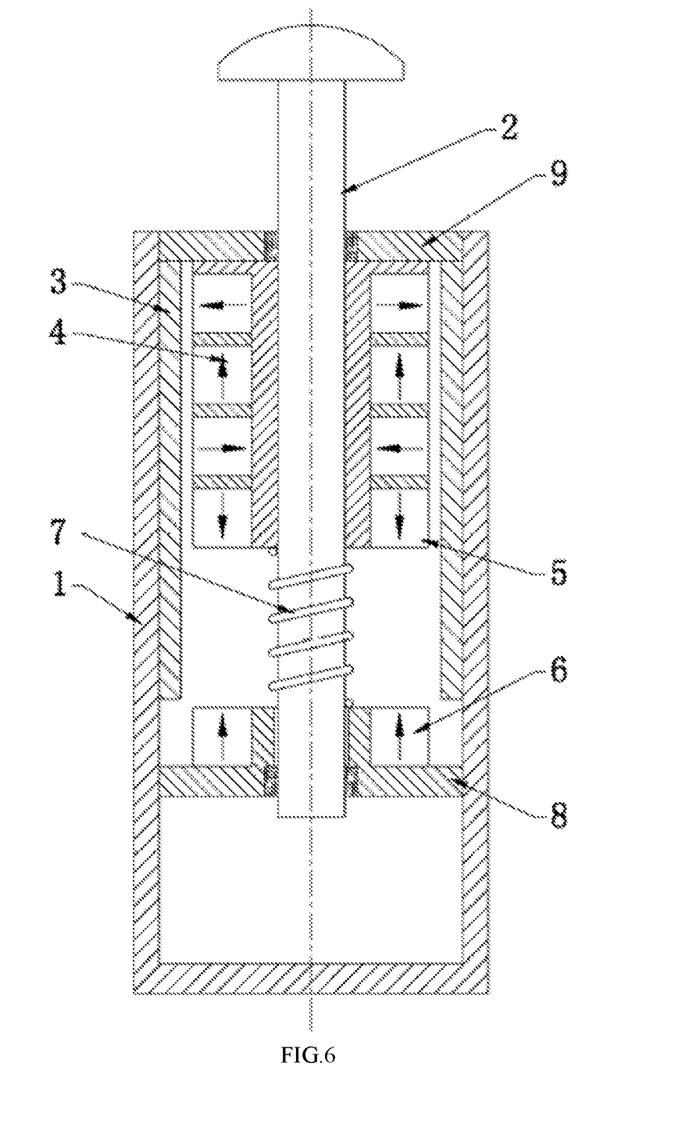
FIG. 6 is a structural schematic diagram of an embodiment 4 of a permanent magnet retarder in the present invention.

As shown in FIG. 6, based on embodiment 1, the difference between embodiment 4 and embodiment 1 is that: the permanent magnet 4 adopts a Halbach array structure; and the upper return permanent magnet 5 and the lower return permanent magnet 6 can also adopt the Halbach array structure.

Embodiment 5

Figure 7:
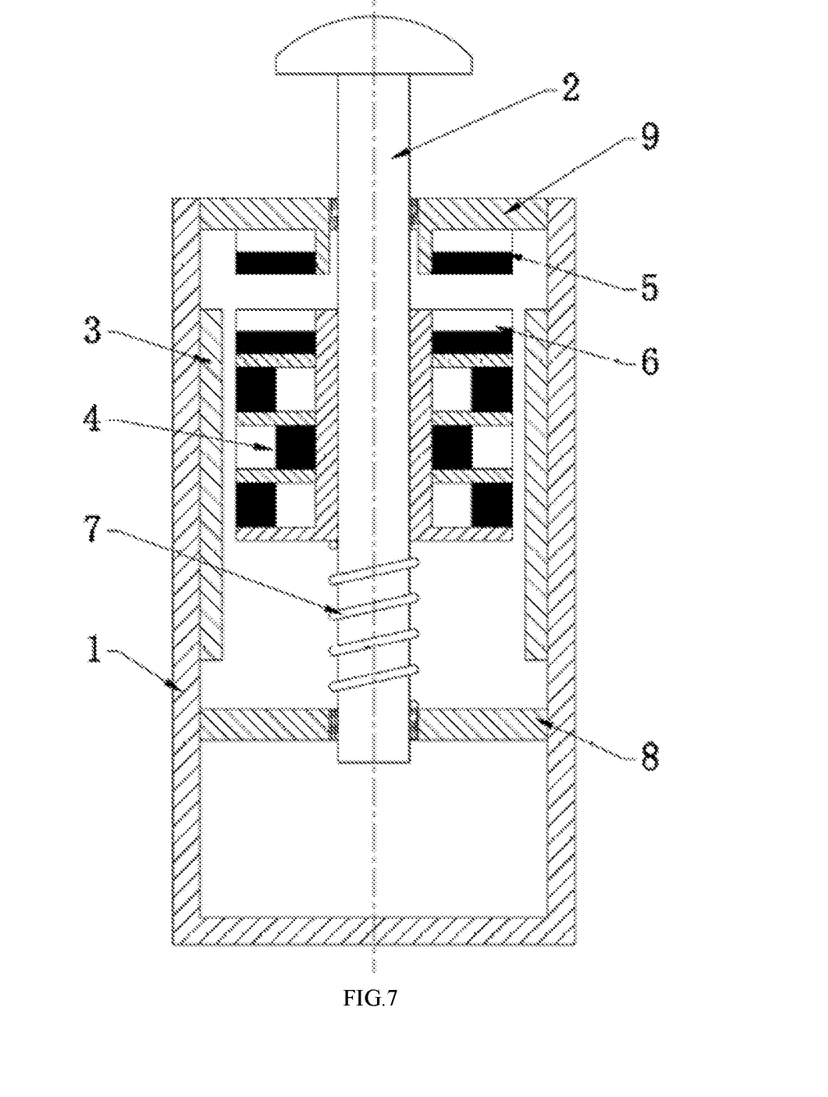
FIG. 7 is a structural schematic diagram of an embodiment 5 of a permanent magnet retarder in the present invention.

As shown in FIG. 7, based on embodiment 1, the difference between embodiment 5 and embodiment 1 is that: the upper return permanent magnet 5 is fixedly disposed on the end cover 9 of the housing 1. At this moment, the lower return permanent magnet 6 is disposed above the permanent magnet 4 on the cylinder 2 relative to the upper return permanent magnet 5 and can move up and down along with the cylinder 2. When the cylinder 2 moves down, the lower return permanent magnet 6 is away from the upper return permanent magnet 5 so that the cylinder 2 needs to overcome the attraction generated between the upper return permanent magnet 5 and the lower return permanent magnet 6 when the cylinder 2 moves down; and the attraction generated between the upper return permanent magnet 5 and the lower return permanent magnet 6 can enable the cylinder 2 to return to zero position after the vehicle passes.

Embodiment 6

Figure 8:
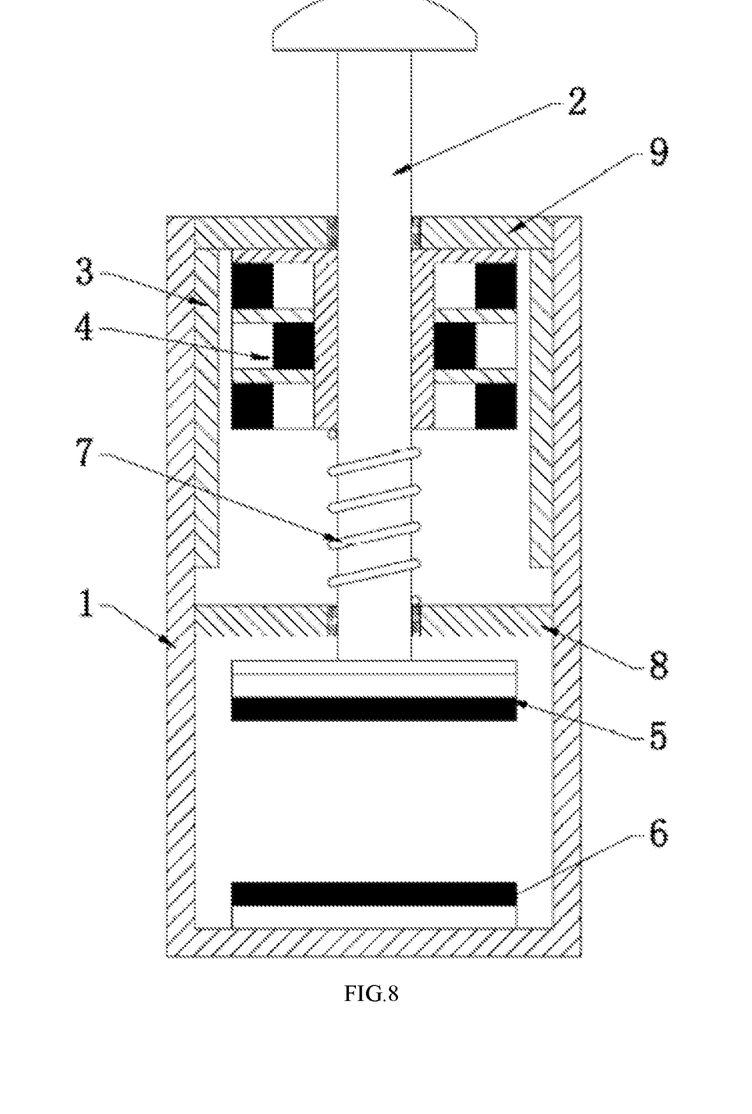
FIG. 8 is a structural schematic diagram of an embodiment 6 of a permanent magnet retarder in the present invention.

As shown in FIG. 8, based on embodiment 1, the difference between embodiment 6 and embodiment 1 is that: the lower return permanent magnet 6 is fixedly disposed on the bottom of the housing 1. At this moment, the upper return permanent magnet 5 is disposed on the bottom end of the cylinder 2 relative to the lower return permanent magnet 6, is positioned below the supporting seat 8 and can move up and down along with the cylinder 2. When the cylinder 2 moves down, the upper return permanent magnet 5 is close to the lower return permanent magnet 6 so that the repulsion generated between the upper return permanent magnet 5 and the lower return permanent magnet 6 is increased, thereby increasing downward resistance of the cylinder 2; and the repulsion generated between the upper return permanent magnet 5 and the lower return permanent magnet 6 can enable the cylinder 2 to return to zero position after the vehicle passes.

Embodiment 7

As shown in FIG. 9, based on embodiment 1, the difference between embodiment 7 and embodiment 1 is that: the conductor 3 is disposed on the cylinder 2 and can move up and down along with the cylinder 2, while the permanent magnet 4 is fixedly disposed on the supporting seat 8 and is static. When the cylinder 2 moves down, the conductor 3 moves down along with the cylinder 2. At this moment, the conductor 3 cuts a magnetic line of force of the permanent magnet 4 and generates eddy current on the conductor 3, and an induced magnetic field generated by the eddy current may hinder the downward motion of the cylinder 2. Meanwhile, the upper side of the permanent magnet 4 is provided with a lower return permanent magnet 6 fixedly disposed on an inner wall of the housing 1. At this moment, the upper return permanent magnet 5 is disposed above the conductor 3 on the cylinder 2 relative to the lower return permanent magnet 6 and can move up and down along with the cylinder 2. When the cylinder 2 moves down, the upper return permanent magnet 5 is close to the lower return permanent magnet 6 so that the repulsion generated between the upper return permanent magnet 5 and the lower return permanent magnet 6 is increased, thereby increasing downward resistance of the cylinder 2; and the repulsion generated between the upper return permanent magnet 5 and the lower return permanent magnet 6 can enable the cylinder 2 to return to zero position after the vehicle passes. In addition, the spring 7 is installed on a bottom end of the cylinder 2 and is not sleeved on the lower part of the cylinder 2. At this moment, the lower end of the spring 7 is fixed to the bottom of the housing 1. When the lower end of the cylinder 2 penetrates through the supporting seat 8 and moves down, the spring 7 is compressed into the bottom of the housing 1.

Embodiment 8

As shown in FIG. 10, based on the above embodiments, the difference of embodiment 8 is that: each layer of permanent magnet 4 is formed by splicing a plurality of permanent magnets.

Embodiment 9

As shown in FIG. 10, based on the above embodiments, the difference of embodiment 9 is that: the housing 1, the cylinder 2, the conductor 3 and the permanent magnet 4 adopt corresponding rectangular structures.

In the permanent magnet retarder of the present invention, through the joint action of the permanent magnet eddy current deceleration assembly and the permanent magnet spring return assembly, the cylinder 2 needs to overcome the resistance to consume energy of the vehicle when the cylinder 2 moves down; and after the vehicle passes, the cylinder 2 can automatically return to the zero position. Relative to the existing hydraulic retarder, the present invention does not need to add the oil or is not replaced regularly; and the nitrogen is not required to be added. Therefore, the permanent magnet retarder of the present invention has low sealing requirement, has the advantages of simple structure, high reliability and low maintenance and repair cost, and is suitable for popularization and use.

The above embodiments are only used for describing the technical idea of the present invention, and shall not be used to limit the protection scope of the present invention. Any change made based on the technical solution according to the technical idea proposed by the present invention shall belong to the protection scope of the present invention. Technologies not involved in the present invention can be realized through the prior art.

We claim:

1. A permanent magnet retarder, comprising a housing and a cylinder; wherein the cylinder is inserted into the housing and movable relative to the housing; the housing is further provided with a conductor and a permanent magnet therein which are disposed oppositely and constitute a permanent magnet eddy current deceleration assembly; the conductor is fixedly disposed on an inner wall of the housing and the permanent magnet is fixedly disposed on the cylinder; alternatively, the conductor is fixedly disposed on the cylinder and the permanent magnet is fixedly disposed on the inner wall of the housing;

when relative motion occurs between the cylinder and the housing, relative motion occurs between the conductor and the permanent magnet; the conductor cuts a magnetic line of force of the permanent magnet and generates eddy current on the conductor, and an induced magnetic field is generated by the eddy current for hindering the relative motion between the housing and the cylinder; the housing is further provided with an upper return permanent magnet and a lower return permanent magnet therein disposed oppositely; and attraction or repulsion generated between the upper return permanent magnet and the lower return permanent magnet make the cylinder return to an initial position automatically;

a supporting seat is fixedly disposed on the inner wall of the housing; the supporting seat is positioned on a lower part of the housing and the cylinder penetrates through the supporting seat and moves down; the lower return permanent magnet is fixedly disposed on the supporting seat, while the upper return permanent magnet is disposed on the cylinder relative to the lower return permanent magnet and movable along with the cylinder;

when the cylinder moves down, the upper return permanent magnet is close to the lower return permanent magnet so that a repulsion generated between the upper return permanent magnet and the lower return permanent magnet is increased, thereby increasing downward resistance of the cylinder; and the repulsion generated between the upper return permanent magnet and the lower return permanent magnet enables the cylinder to return to the initial position.

2. The permanent magnet retarder of claim 1, wherein a spring that enables the cylinder to return to the initial position is also arranged on the cylinder; and the spring, the upper return permanent magnet and the lower return permanent magnet form a permanent magnet spring return assembly that enables the cylinder to return to the initial position automatically.

3. The permanent magnet retarder of claim 2, wherein the spring is sleeved on a lower part of the cylinder.

4. The permanent magnet retarder of claim 2, wherein the spring is installed on a bottom end of the cylinder; and the lower end of the spring is fixed to the bottom of the housing.

5. The permanent magnet retarder of claim 1, wherein the permanent magnet is formed by one permanent magnet, or is an array formed by a plurality of permanent magnets or is formed by splicing a plurality of permanent magnets; and when the permanent magnet is an array structure formed by a plurality of permanent magnets, polarities of adjacent permanent magnets are different.

6. The permanent magnet retarder of claim 1, wherein a part of the cylinder exposed from the housing is provided with an elastic protective sheath to prevent dust from entering the housing.

7. The permanent magnet retarder of claim 1, wherein the housing, the cylinder, the conductor and the permanent magnets are of polygon structure.

8. A permanent magnet retarder, comprising a housing and a cylinder; wherein the cylinder is inserted into the housing and movable relative to the housing; the housing is further provided with a conductor and a permanent magnet therein which are disposed oppositely and constitute a permanent magnet eddy current deceleration assembly; the conductor is fixedly disposed on an inner wall of the housing and the permanent magnet is fixedly disposed on the cylinder; alternatively, the conductor is fixedly disposed on the cylinder and the permanent magnet is fixedly disposed on the inner wall of the housing; when relative motion occurs between the cylinder and the housing, relative motion occurs between the conductor and the permanent magnet; the conductor cuts a magnetic line of force of the permanent magnet and generates eddy current on the conductor, and an induced magnetic field is generated by the eddy current for hindering the relative motion between the housing and the cylinder; the housing is further provided with an upper return permanent magnet and a lower return permanent magnet therein disposed oppositely; and attraction or repulsion generated between the upper return permanent magnet and the lower return permanent magnet make the cylinder return to an initial position automatically; wherein the lower return permanent magnet is fixedly disposed on the inner wall of the housing; the upper return permanent magnet is disposed on the cylinder relative to the lower return permanent magnet and movable along with the cylinder; when the cylinder moves down, the upper return permanent magnet is close to the lower return permanent magnet so that a repulsion generated between the upper return permanent magnet and the lower return permanent magnet is increased, thereby increasing downward resistance of the cylinder; and the repulsion generated between the upper return permanent magnet and the lower return permanent magnet enables the cylinder to return to the initial position.

9. A permanent magnet retarder, comprising a housing and a cylinder; wherein the cylinder is inserted into the housing and movable relative to the housing; the housing is further provided with a conductor and a permanent magnet therein which are disposed oppositely and constitute a permanent magnet eddy current deceleration assembly; the conductor is fixedly disposed on an inner wall of the housing and the permanent magnet is fixedly disposed on the cylinder; alternatively, the conductor is fixedly disposed on the cylinder and the permanent magnet is fixedly disposed on the inner wall of the housing; when relative motion occurs between the cylinder and the housing, relative motion occurs between the conductor and the permanent magnet; the conductor cuts a magnetic line of force of the permanent magnet and generates eddy current on the conductor, and an induced magnetic field is generated by the eddy current for hindering the relative motion between the housing and the cylinder; the housing is further provided with an upper return permanent magnet and a lower return permanent magnet therein disposed oppositely; and attraction or repulsion generated between the upper return permanent magnet and the lower return permanent magnet make the cylinder return to an initial position automatically; wherein the lower return permanent magnet is fixedly disposed on the bottom of the housing; the upper return permanent magnet is disposed on the bottom end of the cylinder relative to the lower return permanent magnet and movable along with the cylinder; when the cylinder moves down, the upper return permanent magnet is close to the lower return permanent magnet so that a repulsion generated between the upper return permanent magnet and the lower return permanent magnet is increased, thereby increasing downward resistance of the cylinder; and the repulsion generated between the upper return permanent magnet and the lower return permanent magnet enables the cylinder to return to the initial position.

* * * * *